Figure 1:
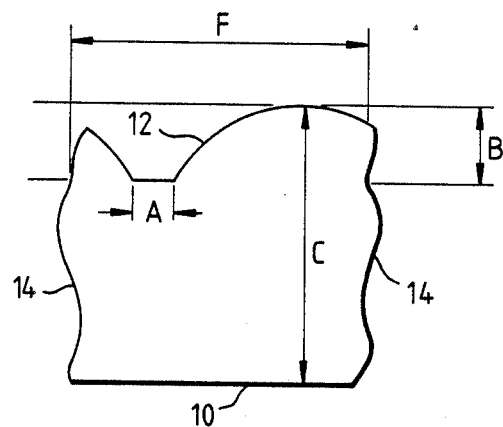

United States Patent [19]

Topham

[11] Patent Number: 4,797,383

[45] Date of Patent: Jan. 10, 1989

[54] CATALYST

[75] Inventor: Susan A. Topham, Stockton-on-Tees, England

[73] Assignee: Imperial Chemical Industries PLC, London, England

[21] Appl. No.: 721,137

[22] Filed: Apr. 9, 1985

Related U.S. Application Data

[63] Continuation of Ser. No. 563,546, Dec. 21, 1983, abandoned, which is a continuation of Ser. No. 352,059, Feb. 24, 1982, abandoned.

[30] Foreign Application Priority Data

Mar. 18, 1981 [GB] United Kingdom ............... 8108409

[51] Int. Cl.$^4$ ............................................ B01J 23/74
[52] U.S. Cl. .................................. 502/338; 502/330; 502/336

[58] Field of Search ............... 502/338, 105, 527, 328, 502/330, 336

[56] References Cited

U.S. PATENT DOCUMENTS

| | | | |
|---|---|---|---|
| 3,644,216 | 2/1972 | Egalon et al. | 502/338 |
| 4,362,655 | 12/1982 | Jenkins | 252/472 |

Primary Examiner—Asok Pal
Attorney, Agent, or Firm—Cushman, Darby & Cushman

[57] ABSTRACT

A metal oxide catalyst composition is in the form of particles having at least one face formed by solidification of melt in contact with a surface and preferably having at least one channelled surface whereby the pressure drop through a bed of such particles is limited. The particles are made preferably by casting a melt thinly and fracturing the resulting layer. Such a composition comprising iron oxide is a precursor of an ammonia synthesis catalyst.

4 Claims, 1 Drawing Sheet

U.S. Patent     Jan. 10, 1989     4,797,383

CATALYST

This is a continuation of application Ser. No. 563,546 filed Dec. 21, 1983, which is a continuation of Ser. No. 352,059 filed Feb. 24, 1982, both now abandoned.

This invention relates to a catalyst and in particular to a cast oxide composition convertible to a catalyst and a method of making it.

Certain catalysts, for example metallic iron catalysts to be used in ammonia synthesis, nitrile hydrogenation or carbon monoxide hydrogenation, are made by a method that includes melting iron oxide (usually mixed with small quantities of other oxides or oxide-precursors), allowing the melt to solidify, crushing the solid and selecting particles of the required size range. This method is objectionable in that the crushing step produces much material of unwanted sizes, which has to be re-worked and is difficult to operate without producing a dusty environment. The particles in the required size range are irregular in shape and thus do not fill a catalyst bed as uniformly as could be desired.

We have now devised a method capable of producing particles that are to a greater extent than before in wanted size ranges. The particles are of a shape not previously used in the catalyst art.

According to the invention a metal oxide catalyst composition is in the form of particles having at least one face formed by solidification of melt in contact with a surface.

Such particles preferably each also have one face formed by solidification not in contact with a surface. The remaining faces are formed by fracture and these naturally are irregular.

The faces may be both substantially flat but, when the particles are to be used in fluid contacting, at least one face formed by solidification is channelled. By this is meant that that face is so profiled that if it were placed in contact with a plane surface there would be formed at least one channel through which fluid could pass. As a result the pressure-drop through a bed of such particles is less than through a bed of particles having only flat faces formed by solidification. This is important when the particles are to be converted to catalyst to be used in a gas reaction at high pressure, for example ammonia synthesis, since excessive pressure-drop results in excessively high power consumption by the gas compressor and circulator.

The channelled profile can be based on any convenient surface shape, for example ribs, intersecting ribs, bosses, quilting or concentric corrugations. Any particle can have on its surface one or more than one channel-bounding projection. The percentage channel area of each particle, that is, the quotient $$\frac{\text{projective cross-sectional area available for fluid flow}}{\text{total projective cross-sectional area}} \times 100$$

of a rectangle having a height equal to the maximum particle depth and a length equal to the width of the particle in the plane beyond which it is not channelled, is preferably in the range 2 to 40, especially 6–25. The maximum channel depth preferably is in the range 10–70, especially 20–40%, of that of the whole particle.

The above-defined form is evidence of methods by which the particles can be made, namely by melting together the constituents of the oxide composition and/or precursors thereof and casting the melt on to a surface, the depth of the cast layer and the shape and pitch of any profiling and the rate of cooling being such that, on solidifying, the layer shrinks and separates from the surface, breaking the layer into particles possibly with light rushing but with under 50% w/w formed by fracture other than through faces formed by solidification. It appears that casting thinly—to a depth of 1–20, especially 2–12 mm—on a surface introduces strains, as a result of which fracture takes place readily and into particles having width between 0.25 and 4 times their depth and a relatively narrow size distribution. In particular few fines are formed and therefore the expensive remelting of the fines formed in considerable quantities with conventional crushing can be largely avoided. If desired the surface on which the melt is cast can be locally differentially cooled by differential thermal conduction, convention or radiation, to generate zones of weakness in the solid layer. The oxides after the casting are in the form of mutually adhering crystallites.

An alternative method, in which a profiled tool such as a roller is passed over the surface of the oxide mixture as it sets, also can produce the channelled shape and is a further feature of the invention. If desired, both methods can be used together and then the catalyst particles are channelled on both sides.

By catalyst composition is meant one that is itself a catalyst or can be converted to a catalyst by chemical treatment or by addition of catalytically active material.

In an important form of the invention the oxide comprises iron oxide, especially to the extent of at least 60% w/w calculated as $Fe_3O_4$ on its constituents not volatile at 900° C. If the particles are to be converted to a hydrogenation catalyst for carbon monixide or nitriles the particles typically contain at least 95% of iron oxide. If they are to be converted to an ammonia synthesis catalyst, they will usually contain other oxides, of which the following are most typical percentages w/w:

| | |
|---|---|
| $K_2O$ | 0.3 to 2.0 |
| CaO | up to 5.0 |
| MgO | up to 2.0 |
| $Al_2O_3$ | 0.5 to 5.0 |

These constituents are known at "promoters", and other promoters, such as oxides of rubidium, cesium, beryllium, lanthanides (especially cerium), actinides (especially uranium), molybdenum or tungsten, metals such as platinum group metals and minor constituents such as silica, can be present instead of or in addition to the typical promoters. In addition, such a catalyst can contain cobalt oxide suitably to the extent of 1–20% w/w calculated as $Co_3O_4$ on the total precursor composition in which the iron oxide is assumed to be all $Fe_3O_4$.

In other forms of the invention the oxide composition comprises one or more of the oxides of copper, nickel or cobalt and is then useful as a precursor of a catalyst for hydrogenation of carbon monoxide or nitriles. Other oxides that can be present alone or in addition include those of transition metals such as those of Groups VA–VIIA of the Periodic Table and also of metals of Groups IIA–IVA: in the latter event the oxide composition is a catalyst support, to which catalytically active material will be added.

After the steps of melting, casting and fracturing, the following steps can be involved in converting the particles to catalyst:

(a) classification, to remove the usually small quantity of fines and oversize and possibly to separate a plurality of wanted size ranges;

(b) tumbling, to remove sharp corners and edges and, in extreme cases, to produce approximately spherical particles;

(c) reduction of reducible oxides to catalytically active metal;

(d) formation of catalytically active metal compound such as carbide or nitride;

(e) passivation of such metal and/or compound by superficial oxidation;

(f) addition of further constituents.

Preferably no further comminution or agglomeration is carried out.

Of these, steps a and c are almost always necessary. Step e, carried out by the catalyst manufacturer, and followed by a further application of step c by the catalyst user after charging a reactor, is important in the ammonia industry, since it enables the synthesis operator to start the process up more quickly. Step f, an example of which is impregnation by a rare earth salt solution, can be applied at any stage, preferably after reduction, and is recommended by some catalyst manufacturers.

The invention includes also a metal composition formed from the oxide composition by reduction, a passivated composition formed from the metal composition by superficial oxidation and a metal composition formed the passivated composition by reduction. Either of such metal compositions is a catalyst for hydrogenation.

There is provided also hydrogenation processes using such a catalyst, in particular an ammonia syntheis process over a metallic iron catalyst in any known conditions, that is, in the pressure range 20–500 bar abs. and a temperature in the range 250°–550° C. Because of the low pressure drop and high activity the catalyst is suitable for recently developed processes at under 200 bar abs. pressure, especially for the new low-energy processes at pressures in the range 30–120 bar abs. and at relatively low temperatures such as 350°–450°, so as to obtain a more favourable equilibrium.

The invention is illustrated by the accompanying drawing, in which

Figure 2:
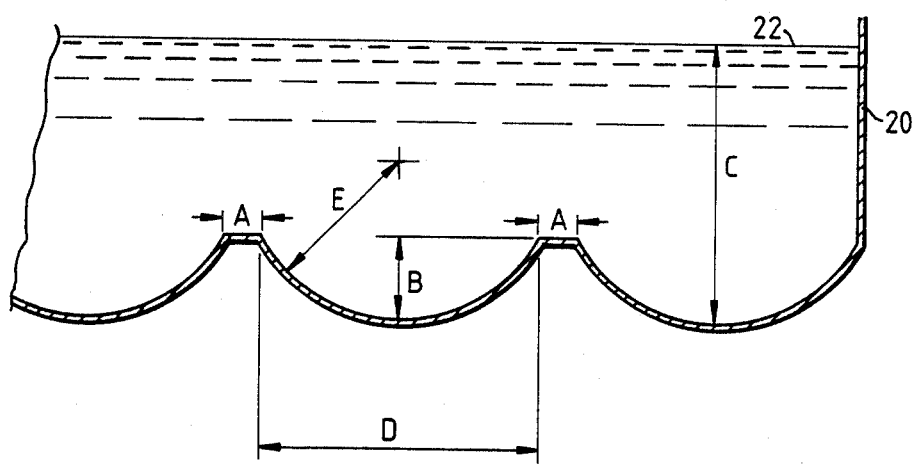

FIG. 1 shows a projective elevation of a particle according to the invention; and FIG. 2 shows in sectional elevation part of a casting tray in which the particles can be made.

In FIG. 1 the particle has a substantially flat face 10, which was the upper surface formed on solidification of a melt, a profiled face 12 formed by solidification of the melt in contact with a surface, and faces 14 formed by fragmentation. Profiled face 12 includes parts of domed regions of height B, separated at their bases by a distance A. The total width of the particle at the plane of the base of the domed regions is F, and thus the rectangle by which the channel area of the particle is to be defined has the area FC. The total height C of the particle is of the same order as width F, but F can be controlled in ways to be described below.

In FIG. 2, casting tray 20 is formed on its internal underside with lengthwise corrugations separated by distance A and of depth B, width D and cross-sectional radius E. In use, tray 20 is normally filled to level 22, giving depth C. When a trayful of melt is cooled and the resulting layer separated and lightly crushed, fracture takes place along lines parallel with and transverse to the corrugations and the size F of the fragments is controlled by reference to depth C and the cooling rate, for a given tray profile and oxide composition: thus for making relatively small particles the depth of melt above A would be smaller in proportion, to ensure fracture between domed regions.

EXAMPLE

A finely powdered mixture of recycled undersize product, natural Swedish magnetite, calcium carbonate, alumina and potassium carbonate corresponding to the composition % w/w:

| | |
|---|---|
| $Al_2O_3$ | 2.4 |
| CaO | 1.4 |
| $K_2O$ | 1.0 |
| $SiO_2$ | 0.4 |
| $Fe_3O_4$ | balance | was melted in an electric furnace for 30 minutes at about 1600° C. and then poured out into mild steel casting trays having a bottom profile as shown in the accompanying drawing, the dimensions denoted by letters being as follows, mm:

| | |
|---|---|
| A | 1 |
| B | 2 |
| C | 7 |
| D | 7 |
| E | 4 |
| F | 7 |

The mixture was allowed to cool in ambient air: on solidifying it shrank and ceased to adhere to the tray. The resulting layer, partly broken, was lightly crushed on a vibrating sifter having an upper 9.5 mm sieve and a lower 5 mm sieve. Particles held on the 9.5 mm sieve were crushed and returned to the sifter. Particles passing the 5 mm sieve were returned to a reservoir, to be used in a later melt: in industrial practice they would be further sieved to give a 3 to 5 mm fraction suitable for radial-flow ammonia synthesis reactors and a fines fraction to be used in a later melt. Particles in the size range 3 to 9.5 mm had one flat face and a corrugated face opposite the flat face and constituted preferred compositions according to the invention. They had the following physical and chemical properties

| | |
|---|---|
| Crystallite size | about 100 nm |
| True density g cm$^{-3}$ | 4.83 |
| particle density g cm$^{-3}$ | 4.79 |
| pore volume cm$^3$g$^{-1}$ | 0.002 |
| Fe$^3$/Fe$^2$ by atoms | 2.42 |
| size analysis % w/w over 9.5 mm | 12.6 (separated) |
| 8 to 9.5 mm | 38.5 |
| 6.35 to 8 mm | 36.3 |
| 4.75 to 6.35 mm | 11.8 |
| 3.35 to 4.75 mm | 0.8 |
| mean particle diameter 7.95 mm (standard deviation 1.4 mm) | |
| percentage channel area 8.6–11.4 (30–40% of rectangle FB) | |

These properties are substantially equal to those of a commercially available ammonia synthesis catalyst made by crushing and classifying; however, the weight percentage of undersize and oversize material was only 25, compared with a typical 90 for the conventional method, on a once-through basis. Very little dust was produced. The particle crush strength and the pressure drop exerted on flowing gas were also measured and were found to be substantially equal to those of the commercial catalyst.

Test in Ammonia Synthesis

A sample of particles (20 g) was diluted with silica chips (80 ml), charged to a semi-technical reactor and over it was passed at 100 l h$^{-1}$ (calculated to 24° C., 1 atm) a pure 3:1 hydrogen:nitrogen mixture at 50 atm pressure. The temperature was raised rapidly to 350° C., then by 15° C. at hourly intervals up to 475° C., and held at 475° C. overnight and until no further increase in outlet gas ammonia concentration took place, showing that reduction was complete.

The temperature was adjusted to 450° C. and the gas flow rate adjusted to various levels over a range to give steadily about 14% conversion to ammonia, then 13, then 12%, whereafter the results were represented as a graph of percentage conversion against flow rate per gram of catalyst. Then to simulate catalyst ageing during long term use the temperature was raised to 550°, held there for 255 hours and lowered to 450° C. A second activity test by flow rate adjustment was then carried out. A similar set of tests were applied to a commercially available catalyst in a parallel reactor. The flow rates, calculated to 1 g of catalyst, and the relative activities of the two catalysts are shown in the Table.

TABLE

| Catalyst condition | % conv. | Flow rates 1 h$^{-1}$ g$^{-1}$ | | Relative activity | |
|---|---|---|---|---|---|
| | | Commercial | Invention | Commercial | Invention |
| Fresh | 14 | 2.77 | 2.95 | 100 | 107 |
| | 13 | 3.35 | 3.55 | 100 | 106 |
| | 12 | 4.17 | 4.45 | 100 | 107 |
| Aged | 14 | 2.37 | 2.60 | 86 | 94 |
| | 13 | 2.97 | 3.18 | 89 | 95 |
| | 12 | 3.53 | 3.70 | 85 | 88 |

I claim:

1. A method of making a hydrogenation catalyst bed of particles having a size within a desired range within the range 1–20 mm comprising the steps of:
    (a) melting a composition comprising iron oxide to the extent of at least 60% w/w calculated as Fe$_3$O$_4$ on its constituents not volatile at 900° C.;
    (b) casting the melt on a surface to a depth within the desired size range and controlling the rate of cooling of the composition so that, on solidifying, the formed layer shrinks and separates from said surface;
    (c) subdividing the resultant solid by light crushing effecting fracture through faces formed by solidification thereby producing particles over 50% w/w of which have two opposed faces formed by solidification, one of these faces is formed by solidification in contact with said surface, with the faces other than said two opposed faces formed by fracture;
    (d) selecting from said particles, particles of the desired size range;
    (e) without any further comminution or agglomeration of the selected particles, charging them to a hydrogenation reactor to form a bed of particles therein, and
    (f) reducing the iron oxide of said selected particles to catalytically active metallic iron before or after step (e); said casting and solidification step (b) being effected to form channels in at least one of the solidification surfaces.

2. A method as in claim 1 wherein said step of forming channels is practiced so that the particles exhibit A channel area in the range 6–25%.

3. A method according to claim 1 wherein said channels are formed by casting the melt on to a profiled surface.

4. A method according to claim 3 wherein said profiled surface is corrugated.

* * * * *